United States Patent [19]

Sacripante et al.

[11] Patent Number: 5,601,689

[45] Date of Patent: Feb. 11, 1997

[54] DEINKING PROCESSES

[75] Inventors: Guerino G. Sacripante, Oakville; David F. Rutland, Milton; Walter Mychajlowskij, Georgetown, all of Canada; J. Stephen Kittelberger, Rochester, N.Y.

[73] Assignee: Xerox Corporation, Stamford, Conn.

[21] Appl. No.: 394,990

[22] Filed: Feb. 27, 1995

[51] Int. Cl.⁶ .................................................. D21C 5/02
[52] U.S. Cl. ........................................ 162/5; 162/8
[58] Field of Search .................................. 162/5, 8

[56] References Cited

U.S. PATENT DOCUMENTS

| | | | |
|---|---|---|---|
| 4,013,505 | 3/1977 | Balcar et al. | 162/5 |
| 4,513,074 | 4/1985 | Nash et al. | 430/106.6 |
| 4,543,313 | 9/1985 | Mahabadi et al. | 430/109 |
| 4,560,635 | 12/1985 | Hoffend et al. | 430/106.6 |
| 5,225,046 | 7/1993 | Borchardt | 162/5 |
| 5,238,768 | 8/1993 | Ong | 430/110 |
| 5,348,830 | 9/1994 | Sacripante | 430/109 |
| 5,348,831 | 9/1994 | Sacripante et al. | 430/109 |
| 5,411,829 | 5/1995 | Sacripante et al. | 430/106 |

OTHER PUBLICATIONS

Encyclopedia of Polymer Science and Engineering, vol. 12, 1985, John Wiley & sons, pp. 364 to 383.

*Primary Examiner*—Donald E. Czaja
*Assistant Examiner*—Steven B. Leavitt
*Attorney, Agent, or Firm*—E. O. Palazzo

[57] ABSTRACT

A process for removing a xerographic image from a substrate which comprises contacting the image with an aqueous solution comprised of water, a surfactant, ionic salts and caustic reagent.

31 Claims, No Drawings

DEINKING PROCESSES

BACKGROUND OF THE INVENTION

This invention is generally directed to toner and developer compositions, and more specifically, the present invention is directed to processes for deinking, or removing toner from paper, a transparency, and the like. In embodiments, the present invention relates to the deinking of substrates fused with toner, such as paper, transparencies, and the like, containing an image developed with a toner comprised of an imide or amic acid based resin and pigment. The process of the present invention, in embodiments, involves the contacting or soaking of the fused image, such as a xerographic image, in an aqueous solution comprised of a mixture of certain ionic salts such as a mixture of sodium chloride, sodium phosphite, ethylenediaminetetracetic acid, tetrasodium salt and the like, and surfactants, preferably a nonionic surfactant such as TRITTON X-100®, and wherein the pH of the solution is basic, for example in excess of about 7, and preferably 8 or more, and which pH can be attained with the addition of caustic reagents such as sodium bicarbonate, sodium hydroxide and the like, and thereafter dissolving the toner resin and removing the liberated dispersed pigment from the substrate by filtration or flotation and washing. The dissolved toner resin can then be optionally reclaimed from the washed aqueous phase by adjusting the pH to 7 or less, which adjustment can be accomplished by the addition of a dilute acid resulting in the precipitation of the imide or amic acid based resin, and thereafter filtered off. Preferably, the toner compositions deinked are comprised of imide based resins such as polyimides, and polyester imides, amic acid based resins such as a polyamic acid, polyester amic acid, or mixtures thereof, and pigment particles comprised of, for example, carbon black, magnetites, or mixtures thereof, cyan, magenta, yellow, blue, green, red, or brown components, or mixtures thereof.

Paper recycling has become an important environmental issue in recent years, and deinking of conventional dry toner images can be a much more difficult problem for the paper recycling industry than that of conventional impact printing inks. The recycling industry utilizes various deinking processes, and the first step is usually to repulp the waste paper in an agitated caustic bath. More specifically, the process involves shredding the paper in an agitated aqueous slurry of about 10 percent consistency by weight of paper at a pH of about 10 to about 11.5. The aforementioned pH is attained by the addition of caustic soda or sodium bicarbonate. The aqueous slurry is then heated at an ambient temperature to about 60° C. for a duration of from about 30 minutes to about 200 minutes. During this repulping stage, the paper absorbs large amounts of water, swells considerably, and is reduced to a slurry of individual hydrated pulp fibers, and various inks are detached from the fibers by differential swelling or disintegration. Dry toner images do not usually swell because of their hydrophobic polymeric composition, and they are not usually degraded by chemical hydrolysis. Dry toner images result in flat platelets about 100 to 200 microns in average diameter and about 10 microns in thickness as measured by microscopic image analysis methods. Conventional impact printing inks are found to disintegrate into much smaller particles, typically 10 microns or less in diameter, primarily because they contain no fused thermoplastic binder resins.

Subsequent steps in the deinking process are designed to remove the liberated ink specks from the hydrated pulp slurry. With small specks liberated from impact-printed papers, these steps are simple and efficient. One or two washing cycles are often sufficient to rinse the small liberated ink specks from the slurry to adequate cleanliness. If this is insufficient, a flotation cell can be added to further clean the pulp. When the waste paper is imaged with dry toner, the slurry contains the much larger aforementioned toner platelets. To achieve adequate cleaning of such pulps, the recycling industry has found it necessary to employ a much more elaborate process. Typically, this comprises six flotation cells in series. Subsequently, the pulp is dewatered in preparation for a high-shear dispersion step to further break up the remaining specks. The dispersion step is energy intensive, and is accompanied by a certain amount of fiber damage. Following this and a redilution step, up to another four flotation steps may be required to remove the broken specks to an adequate cleanliness.

In the present invention, a process for the deinking of toner compositions comprised of an imide or amic acid based resin with pigment is illustrated. More specifically, this process is comprised of dissolving the imide or amic based toner resin in aqueous media under milder caustic repulping conditions of a pH of about 8 to about 10 in the presence of ionic salts, such as sodium chloride, sodium phosphite, ethylene diamine tetracetic acid tetrasodium salt, and optionally a nonionic surfactant, such as TRITTON X-100®, NEOGEN®, or NEOGEN SC® and the like, at from about ambient temperature to about 80° C. These conditions cause the imide or amic acid based toner resin to dissolve in the aqueous phase and liberate pigment particles to less than or equal to about 0.5 micron, and preferably from about 0.05 micron to about 0.255 micron in average volume diameter. This enables the use of the aforementioned simple ink speck removal typically effective only for impact-printed papers. Therefore, the toner ink specks are much easier to remove resulting in a more economical process and superior quality pulp. This differs from the conventional deinking process wherein the toner resin particles are not dissolved but broken down in particle size by the mechanical action, and require more aforementioned elaborate flotation and washing techniques to remove the toner particle specks from the pulp slurry.

The aforementioned imide based toner compositions are illustrated in U.S. Pat. No. 5,348,830, the disclosure of which is totally incorporated herein by reference, and these resins can be generated by a preparative process involving the melt polycondensation of about 1 mole equivalent of dianhydride, and from about 1 mole equivalent of an alkylene diamine, or preferably a diamino terminated alkylene oxide, such as the diamino terminated polyalkylene oxide available from Texaco Chemicals as JEFFAMINE D-230™, D-400™, D-700™, EDR-148™, EDR-192™ as illustrated by the formulas

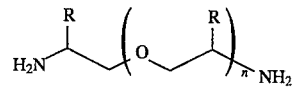

wherein

| | |
|---|---|
| EDR-148 ™ | n = 2; R = H |
| EDR-192 ™ | n = 3; R = H |
| D-230 ™ | n = 2,3; R = $CH_3$ |
| D-400 ™ | n = 5,6; R = $CH_3$. |

The aforementioned resins exhibit a number average molecular weight of from about 1,500 to about 50,000 grams per mole as measured by vapor phase osmometry, and a glass transition temperature of from about 40° C. to about 80° C., and more preferably of from about 50° C. to about 65° C. as measured by the Differential Scanning Calorimeter.

There is disclosed in U.S. Pat. No. 5,411,831 toner compositions comprised of a crosslinked polyimide resin and pigment, and process thereof. There is also disclosed in U.S. Pat. No. 5,413,888 gloss switching toners with certain polyimides. The toner compositions of the U.S. Pat. No. 5,411,831 are crosslinked to about 30 gel or more and are believed to yield with broad fusing latitude characteristics, and moreover result in low gloss characteristics and not high gloss.

Illustrated in the following U.S. Patents, the disclosures of each being totally incorporated herein by reference, are:

U.S. Pat. No. 5,348,831, which illustrates a toner composition comprised of pigment, and a polyester imide resin of the formula

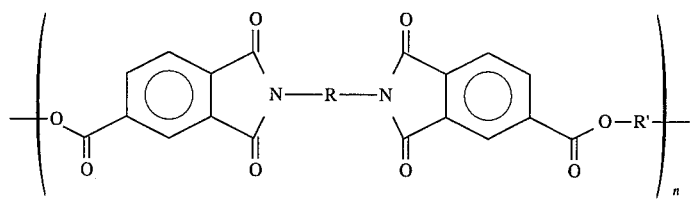

wherein n represents the number of segments present and is a number of from about 10 to about 10,000; R' is alkylene; and R is independently selected from the group consisting of an oxyalkylene and polyoxyalkylene.

Illustrated in U.S. Pat. No. 5,552,254, the disclosure of which is totally incorporated herein by reference, are toners containing polyamic acid resins of the formulas

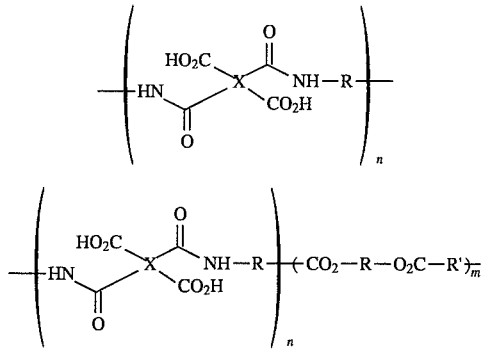

wherein X is a tetrasubstituted aromatic or cycloaliphatic group with from about 6 to about carbon atoms, R is alkylene, alkyleneoxyalkylene or poly(alkyleneoxy)alkylene; and R' is a divalent aromatic, cycloaliphatic or aliphatic group, and n and m represent random segments of the polymer. In embodiments, the aforementioned polyamic based toners can be deinked using the conditions of this invention, and more specifically, at a pH of about 8.0 with certain ionic salts and optionally a nonionic surfactant. Similarly, there is further illustrated in U.S. Pat. No. 5,512,401, the disclosure of which is totally incorporated herein by reference, toners containing polyimide amic acid resins.

Illustrated in U.S. Pat. No. 5,409,293, the disclosure of which is totally incorporated herein by reference, are deinkable toners containing polyimide-imine, polyimides, and wherein the deinking involves resin decomposition in alkaline or caustic aqueous conditions at a pH of from about 10 to a pH of about 14.

Illustrated in U.S. Pat. No. 5,411,829, the disclosure of which is totally incorporated herein by reference, are deinkable toners containing a cycloaliphatic polyimide resin, and wherein the deinking involves resin dissolution in alkaline or caustic aqueous conditions at a pH of from about 10 to a pH of about 14.

SUMMARY OF THE INVENTION

It is an object of the present invention to provide a deinking process for waste paper imaged with, or containing a thermoplastic toner containing an imide or amic acid based resin and pigment particles thereof with many of the advantages illustrated herein.

In another object of the present invention there are provided the mild caustic deinking or removal of toner from substrates, such as paper or transparencies.

In yet another object of the present invention there are provided processes for the the deinking of waste paper containing a heat fused toner comprised of a polyimide resin, a polyester imide resin, a polyimide amic acid resin, a polyamic acid resin, or a polyester amic acid resin.

Moreover, in another object of the present invention there are provided processes for the removal of fused toner from paper or transparencies, wherein the toner resin is comprised of an imide based toner resin, such that the fused toner resin dissolves in mild alkaline or caustic aqueous conditions, such as at a pH of from about 8 to a pH of about 10, in the presence of ionic salts and nonionic surfactants.

In another object of the present invention there are provided processes for the removal of toner compositions from paper, wherein the waste paper is soaked and pulped in an aqueous solution comprised of caustic reagents, such as sodium bicarbonate, sodium carbonate, sodium hydroxide, potassium hydroxide to a pH of about 8 to 10, ionic salts such as sodium chloride, sodium phosphite, which salts are comprised of about 1 to 2 percent by weight of aqueous solution, and a nonionic surfactant such as TRITTON X-100® at a concentration of about 2 percent by weight.

Moreover, in another object of the present invention there are provided processes for the deinking of waste paper imaged with a fused toner containing an imide based toner resin with low melt fusing temperatures of from about 130° C. to about 145° C.

In another object of the present invention there are provided processes for the deinking of waste paper imaged with a fused toner containing an imide based toner composition with glass transition temperatures of from about 50° C. to about 65° C.

In yet another object of the present invention there are provided processes for the deinking of waste paper imaged with a fused toner containing an imide based toner resin with a number average molecular weight of from about 1,500 grams per mole to about 100,000 grams per mole, and with a polydispersity of from about 2 to about 17 as measured by GPC.

These and other objects of the present invention can be accomplished in embodiments thereof by providing processes for deinking waste paper imaged with a fused toner containing an imide or amic acid resin of the formulas as illustrated herein, reference for example the copending applications and patents mentioned herein, and pigment particles. Specifically, in embodiments, the present invention relates to a paper deinking process comprised of contacting, pulping or soaking of the fused image, such as a xerographic image, in an aqueous solution of ionic salts, such as sodium chloride, sodium phosphite, ethylenediaminetetracetic acid tetrasodium salt and sodium fluoride, in an amount, for example, of from about 1 to about 5 percent by weight in water, and with surfactants, preferably a nonionic surfactant such as TRITTON X-100® in an amount of from about 1 to about 3 weight percent of the aqueous solution, and wherein the pH of the solution is, for example, in excess of, or equal to about 8, and preferably from about 8 to about 10 with the addition of caustic agents such as sodium bicarbonate, sodium hydroxide and the like. Thereafter, the toner resin is dissolved from the fused image liberating the dispersed pigment, and which resin can be removed from the substrate by filtration or flotation and washing. The dissolved resin can then be optionally reclaimed from the washed aqueous phase by adjusting the pH to about 7 or less, which adjustment can be accomplished by the addition of a dilute acid resulting in the precipitation of the imide or amic acid based resin, and thereafter filtered and removed. In embodiments, the present invention relates to a process for removing a fused image from a substrate which comprises contacting the image with an aqueous solution comprised of water, a surfactant, ionic salts and a caustic reagent, or component; a process for deinking from paper a toner image which comprises contacting the image with an aqueous solution comprised of water, ionic salts and a surfactant, and which solution is at a pH of from about 8 to about 10; and a process which comprises providing an image on a substrate, and removing the image by contacting it with an aqueous solution comprised of water, surfactant, ionic salt and caustic component.

The process of the present invention in embodiments comprises contacting, pulping or soaking a substrate, such as paper, with a developed image comprised of an imide resin and pigment particles in an aqueous solution containing a surfactant,-such as TRITTON X-100®, EMULGEN®, ANTAROX®, IGEPAL®, ionic salts, such as sodium chloride, sodium phosphite ethylenediamine tetracetic acid sodium salts and the like, and a caustic reagent, such as sodium hydroxide, in order that a pH of about 8 or to about 12 is attained; dissolving the fused toner resin image in the aqueous mixture by agitation of the pulp and thus liberating pigmented particles of from about 50 to about 200 nanometers in size, and thereafter separating the pigmented particles from the pulp by filtration and washing, thereby resulting in an excellent clean pulp free of toner. The dissolved imide resin can then be reclaimed from the waste water and washings by the addition of an acid, preferably a dilute acid such as hydrochloric acid, whereby the pH decreases to about 7 or slightly less, causing the imide resin to precipitate, followed by removal with, for example, filtration.

More specifically, the process of the present invention in embodiments comprises pulping the toned image specimen, such as xerographic paper, with a toned fused image thereon to 1.2 percent consistency by weight with water using a standard pulp disintegrator operated at from about 3,000 revolutions per minute to about 50,000 revolutions per minute for a duration of from about 5 minutes to about 2 hours. The various brands and suppliers of standard pulp disintegrator can be obtained on the Test Equipment Suppliers list in the bound set of TAPPI Test Methods available from the TAPPI Information Resource Center. After disintegration, the pulp mixture is diluted to about 0.3 percent consistency with water comprised of from about 0.5 percent to about 10 percent by weight of surfactant, such as TRITTON X-100®, EMULGEN®, ANTAROX®, IGEPAL®, from about 0.5 percent to about 10 percent by weight of ionic salts, such as ISOTONE II®, available from Coulter Electronics Inc. and comprised of about 7.93 grams per liter of water of sodium chloride, about 0.38 gram per liter of water of ethylenediamine tetracetic acid disodium salt, about 0.4 grams per liter of water of potassium chloride, about 0.19 gram per liter of water of monosodium phosphate, about 1.95 grams per liter of water of disodium phosphate, and caustic reagents, such as sodium bicarbonate, potash or alkali hydroxide such that a pH of about 8 or to about 10 is attained. The mixture is then stirred for a duration of from about 30 minutes to about 2 hours, after which the pulp is separated from the aqueous mixture by known methods. The aqueous mixture can then be neutralized with acids, such as hydrochloric acid or acetic acid to a pH of less than 7. The resulting precipitated resin is then filtered off and reclaimed.

Various known colorants present in the toner in an effective amount of, for example, from about 1 to about 25 percent by weight of toner, and preferably in an amount of from about 1 to about 15 weight percent that can be selected for forming the toned image include carbon black like REGAL 330® magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites BAYFERROX 8600™, 8610™; Northern Pigments magnetites NP-604™, NP-608™; Magnox magnetites TMB-100™, or TMB-104™; and other equivalent black pigments. As colored pigments, there can be selected known cyan, magenta, yellow, red, green, brown, blue or mixtures thereof. Specific examples of pigments include HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as CI 60710, CI Dispersed red 15, diazo dye identified in the Color Index as CI 26050, CI Solvent red 19, and the like. Illustrative examples of cyan materials that may be used as pigments include copper tetra-(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI.

Surfactants utilized are known and include, for example, nonionic surfactants such as polyvinyl alcohol, polyacrylic acid, methalose, methyl cellulose, ethyl cellulose, propyl cellulose, hydroxy ethyl cellulose, carboxy methylcellulose, polyoxyethylene cetyl ether, polyoxyethylene lauryl ether, polyoxyethylene octyl ether, polyoxyethylene octyphenyl ether, polyoxyethylene oleyl ether, polyoxyethylene sorbitan monolaurate, polyoxyethylene stearyl ether, polyoxyethylene nonylphenyl ether (available from GAF as IGEPAL CA-210™, IGEPAL CA-520™, IGEPAL CA-720™, IGEPAL CO-890™, IGEPAL CO-720™, IGEPAL CO-290™, IGEPAL CA-210™), ANTARAX 890™ and ANTARAX 897™ available from Rhone-Poulenc, dialkylphenoxy poly(ethyleneoxy)ethanol, TRITTON X-100®; anionic surfactants such as sodium dodecylsulfate (SDS), sodium dodecylbenzenesulfate, sodium dodecylnaphthalenesulfate, dialkyl benzenealkyl, sulfates and sulfonates, and the like; cationic surfactants such as dialkyl benzenealkyl ammonium chloride, lauryl trimethyl ammonium chloride, alkylbenzyl methyl ammonium chloride, halide salts of quaternized polyoxyethylalkylamines, dodecylbenzyl triethyl ammonium chloride, MIRAPOL™ and ALKAQUAT™ available from Alkaril Chemical Company, SANIZOL™, available from Kao Chemicals, and the like and mixtures thereof. An effective concentration of the surfactant generally employed is, for example, from about 0.01 to about 10 percent by weight, and preferably from about 0.1 to about 5 percent by weight of the aqueous mixture.

Ionic salts utilized include sodium chloride, potassium chloride, sodium bromide, potassium bromide, potassium iodide, magnesium chloride, berylium chloride, calcium chloride, zinc chloride, ethylenediamine tetracetic acid disodium salt, ethylenediamine tetracetic acid, ethylenediamine tetracetic acid tetra sodium salt, monosodium phosphate, disodium phosphate, monopotassium phosphate, dipotassium phosphate, sodium fluoride, potassium fluoride, and mixtures thereof, and which salts are present, for example, in an amount of from about 1 to about 10 percent by weight of water. Additionally, solutions of ionic salts such as ISOTONE II®, available from Coulter Electronics, can be utilized and these salts are believed to be comprised of a mixture of about 7.93 grams per liter of water of sodium chloride, about 0.38 gram per liter of water of ethylenediamine tetracetic acid disodium salt, about 0.4 gram per liter of water of potassium chloride, about 0.19 gram per liter of water of monosodium phosphate, about 1.95 grams per liter of water of disodium phosphate, and about less than 0.5, for example from about 0.05 to about 0.5 gram, per liter of water of sodium fluoride.

Examples of caustic reagents that can be selected include sodium bicarbonate, sodium hydrogen carbonate, potassium bicarbonate, sodium carbonate, potassium carbonate, sodium hydroxide, potassium hydroxide, potash, magnesium hydroxide, aluminum hydroxide, lithium hydroxide, lithium bicarbonate, lithium carbonate, ammonia, ammonium hydroxide, ammonium bicarbonate, ammonium carbonate or mixture thereof, and which reagents, or components are utilized, for example, in amounts of from about 0.1 to about 5 percent by weight of water.

The acids utilized for neutralizing the basic aqueous mixture is, for example, selected from the group comprised of hydrochloric acid, hydrobromic acid, hydroiodic acid, sulfuric acid, phosphoric acid, acetic acid, acetic anhydride, citric acid, abietic acid and mixtures thereof; and these acids are, for example, selected in an amount of from about 0.1 percent to about 5 percent by weight of water.

Surface additives in effective amounts, such as from about 0.1 to about 3 weight percent, that can may be present in the toner compositions selected to obtain the image to be deinked, or removed include, for example, metal salts, metal salts of fatty acids, colloidal silicas, mixtures thereof and the like, reference U.S. Pat. Nos. 3,590,000; 3,720,617; 3,655,374 and 3,983,045, the disclosures of which are totally incorporated herein by reference. Preferred additives include zinc stearate and AEROSIL R972® available from DeGussa. The aforementioned toners may contain other components such as charge additives and the like.

The following Examples are being provided to further define various species of the present invention, it being noted that these Examples are intended to illustrate and not limit the scope of the present invention. Parts and percentages are by weight unless otherwise indicated.

EXAMPLE I

Polyamic acid derived from B-4400 dianhydride and JEFFAMINE 230™ by melt condensation process as described in copending application U.S. Ser. No. (not yet assigned—D/94915), the disclosure of which is totally incorporated herein by reference, was prepared as follows:

To a 7.6 liter Parr reactor equipped with a two blade turbine stirrer and a thermocouple were added 1,568 grams (6.82 mole) of JD 230™ (Texaco Chemicals) and 320 grams (0.8 mole) of JD-400™ (Texaco Chemicals). This mixture was stirred at 100 rpm while 2,000 grams (7.7 moles) of 5-(2,5-dioxotetrahydrol)-3-methyl-3-cycloxexene-1,2-dicarboxylic anhydride (B-4400, Dai Nippon Ink Company) were added. An exotherm is observed which heats up the reaction mixture from 20° C. to 59° C. The reactor was sealed and heated to 75° C. Once the reaction reached 75° C., a second exotherm occurred raising the reaction temperature to 145° C. The reaction was stirred for 30 minutes to complete the reaction, and then discharged and cooled. Tg of the product of the polyamic acid resin was 61° C. Molecular weight, measured by GPC against polystyrene standards, was $M_n$ 4,200 and $M_w$ 8,600. Softening point of the resin product, as measured on a Mettler Softening Point Instrument was 120° C. A toner composition comprised of 98 percent by weight of this polyamic acid, and 2 percent by weight of PV FAST BLUE™ pigment was prepared as follows.

The above polyamic acid resin product was in the form of a large chunk. The resulting polymer was ground to about 500 microns average volume diameter in a Model J Fitzmill equipped with an 850 micrometer screen. After grinding, 980 grams of polymer were mixed with 20 grams of PV FAST BLUE™ pigment. The two components were dry blended first on a paint shaker and then on a roll mill. A Davo twin screw extruder was then used to melt mix the aforementioned mixture at a barrel temperature of 120° C., screw rotational speed of 50 rpm, and at a feed rate of 20 grams per minute. The extruded strands were broken into coarse particles and an 8 inch Sturtevant micronizer was used to reduce the particle size further. After grinding, the toner was measured to display an average volume diameter particle size of 7 microns with a geometric distribution of 1.39 as measured by the Coulter Counter. The resulting toner was then utilized without further classification. A developer composition was prepared by roll milling the aforementioned toner, 3 parts by weight with 100 parts by weight of Xerox Corporation 5034 carrier particles. Copies on both paper and transparency were then produced with a Xerox Corporation 5034 machine fixture containing the aforementioned developer.

EXAMPLE II

Deinking of the fused images on paper resulting from Example I was accomplished as follows:

Ten paper fused images of Example I were soaked in a tray comprised of an aqueous mixture of 1 liter of ISOTONE II®, available from Coulter Electronics Inc., 10 grams of TRITTON X-100® surfactant and about 1 gram of sodium bicarbonate. The fused images were left soaking for a duration of 2 hours. The fused images were found to be completely removed from the paper and the aqueous mixture was analyzed for particle size using a Coulter Counter Multisizer II, available from Coulter Electronics Inc. No particles were detected in the range of 1 to 100 microns. A sample of the aqueous mixture was then viewed under a microscope, whereby the pigment could be visualized as submicron particles.

EXAMPLE III

Deinking of the fused images on transparency resulting from Example I was accomplished as follows:

Five transparency fused images of Example I were soaked in a tray comprised of an aqueous mixture of 1 liter of ISOTONE II®, available from Coulter Electronics Inc., 10 grams of TRITTON X-100® surfactant and about 1 gram of sodium bicarbonate. The fused images were left soaking for a duration of 2 hours. The fused images were found to be completely removed from the transparency and the aqueous mixture was analyzed for particle size using a Coulter Counter Multisizer II, available from Coulter Electronics Inc. No particles were detected in the range of 1 to 100 microns. A sample of the aqueous mixture was then viewed under a microscope, whereby the pigment could be visualized as submicron particles. The transparencies were then washed with water and dried. The dried transparencies were found to be void of an image. The transparency was also reimaged in a 5034 copier, thus demonstrating its recyclability.

EXAMPLE IV

Deinking of the fused images on paper resulting from Example I by the conventional repulping process as utilized by the paper recycling industry was accomplished as follows.

Three-hundred grams dry weight (about 70 imaged copies of Example I) were added to a laboratory repulper along with sufficient, 45° C., ISOTONE II® to achieve a pulp consistency to 3 percent. The pH was adjusted to 10.0 with sodium hydroxide, and 0.2 percent (based on the dry weight of copies) of Hipochem DI-2000 deinking surfactant was added. This slurry was agitated in the repulper at 45° C. for 60 minutes total repulping time. At the conclusion of repulping, samples of the pulp were drawn for the preparation of standard TAPPI handsheets; 1.2 gram samples were used to prepare handsheets for brightness measurements, and 0.6 gram samples were used for handsheets for image analysis.

Ink specks and other contaminants are most commonly removed from recycled pulp by the flotation technique. For flotation studies, an 867 gram sample of the repulped slurry was further diluted with deionized water to 1 percent consistency, or a total volume of about 2.6 liters. This sample was adjusted to 45° C., and added to a Denver Laboratory Flotation Cell. Flotation to remove the toner image specks was conducted at 1,200 rpm rotor speed for a total of three minutes with the ink-laden foam being removed manually throughout the run. The samples of the purified pulp slurry were again converted to handsheets using the procedures described above.

The brightness of the samples after repulping and after flotation was determined using the standard TAPPI brightness procedure.

The results of the image analysis evidenced that images generated from Example I disintegrated on repulping into very small particles, the most abundant of which were submicrons in diameter and believed to be pigment particles, the lower limit of the image analyzer's resolution. The handsheets analyzed for brightness showed a relative brightness of about 85 percent.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for removing a fused image from a substrate consisting essentially of contacting the image with an aqueous solution consisting essentially of water, a surfactant, ionic salts and a caustic reagent.

2. A process in accordance with claim 1 wherein the fused image component is reclaimed by subsequent addition to the aqueous solution of an acid, followed by isolation of the fused image components.

3. A process in accordance with claim 1 wherein the surfactant is selected from the group consisting of polyvinyl alcohol, methalose, methyl cellulose, ethyl cellulose, propyl cellulose, hydroxy ethyl cellulose, carboxy methylcellulose, polyoxyethylene cetyl ether, polyoxyethylene lauryl ether, polyethyleneoxide, polyoxyethylene octyl ether, polyoxyethylene octyphenyl ether, polyoxyethylene oleyl ether, polyoxyethylene sorbitan monolaurate, polyoxyethylene stearyl ether, polyoxyethylene nonylphenyl ether, and dialkylphenoxy poly (ethyleneoxy)ethanol, sodium dodecylsulfate, sodium dodecylbenzenesulfate, sodium dodecylnaphthalenesulfate, dialkyl benzenealkyl ammonium chloride, lauryl trimethyl ammonium chloride, alkylbenzyl methyl ammonium chloride, dodecylbenzyl triethyl ammonium chloride, and halide salts of quaternized polyoxyethylalkylamines.

4. A process in accordance with claim 1 wherein the ionic salts are selected from the group consisting of sodium chloride, potassium chloride, sodium bromide, potassium bromide, potassium iodide, magnesium chloride, berylium chloride, calcium chloride, zinc chloride, ethylenediamine tetracetic acid disodium salt, ethylenediamine tetracetic acid, ethylenediamine tetracetic acid tetra sodium salt, monosodium phosphate, disodium phosphate, monopotassium phosphate, dipotassium phosphate, sodium fluoride, potassium fluoride, and mixtures thereof.

5. A process in accordance with claim 1 wherein the ionic salts are comprised of a mixture of sodium chloride, ethylenediamine tetracetic acid disodium salt, potassium chloride, monosodium phosphate, disodium phosphate, and sodium fluoride.

6. A process in accordance with claim 1 wherein the caustic reagent is selected from the group consisting of sodium bicarbonate, sodium hydrogen carbonate, potassium bicarbonate, sodium carbonate, potassium carbonate, sodium hydroxide, potassium hydroxide, potash, magnesium hydroxide, aluminum hydroxide, lithium hydroxide, lithium bicarbonate, lithium carbonate, ammonia, ammonium hydroxide, ammonium bicarbonate, and ammonium carbonate.

7. A process in accordance with claim 1 wherein the aqueous solution is comprised of from about 1 percent to about 10 percent by weight of a surfactant, from about 0.5 percent to about 10 percent by weight of ionic salts, and from about 0.1 percent to about 10 percent by weight of caustic reagent.

8. A process in accordance with claim 1 wherein the ionic salts are comprised of a mixture of from about 5 to about 10 grams per liter of water of sodium chloride, from about 0.1 to about 0.5 gram per liter of water of ethylenediamine tetracetic acid disodium salt, from about 0.1 to about 1 gram per liter of water of potassium chloride, from about 0.05 to about 0.5 gram per liter of water of monosodium phosphate, from about 1 to about 5 grams per liter of water of disodium phosphate, and from about 0 to about 2 grams per liter of water of sodium fluoride.

9. A process in accordance with claim 1 wherein the ionic salts are comprised of a mixture of about 7.93 grams per liter of water of sodium chloride, about 0.38 gram per liter of water of ethylenediamine tetracetic acid disodium salt, about 0.4 gram per liter of water of potassium chloride, about 0.19 gram per liter of water of monosodium phosphate, about 1.95 grams per liter of water of disodium phosphate, and about less than 0.5 gram per liter of water of sodium fluoride.

10. A process in accordance with claim 2 wherein the acid is hydrochloric acid, hydrobromic acid, hydroiodic acid, sulfuric acid, phosphoric acid, acetic acid, acetic anhydride, citric acid, or abietic acid.

11. A process in accordance with claim 1 wherein the pH of the resultant aqueous mixture is from about 8 to about 10.

12. A process in accordance with claim 2 wherein the pH is from about 1 to about 7.

13. A process in accordance with claim 1 wherein the fused image is comprised of a mixture of a nitrogen based resin, and a pigment.

14. A process in accordance with claim 13 wherein said resin is a thermoplastic resin selected from the group consisting of a polyimide, a polyamic acid, a polyimide imine, a polyester imide, a polyimide amic acid, a polyester amic acid, and a copolyimide-copolyamic acid.

15. A process in accordance with claim 1 wherein the surfactant is present in an amount of from about 0.5 to about 10 weight percent.

16. A process in accordance with claim 1 wherein the ionic salts are present in an amount of from about 0.5 to about 5 weight percent.

17. A process in accordance with claim 1 wherein the caustic reagent is present in an amount of from about 0.1 to about 10 weight percent.

18. A process in accordance with claim 2 wherein the acid is present in an amount of from about 1 to about 10 weight percent.

19. A process in accordance with claim 1 wherein the substrate is paper.

20. A process in accordance with claim 1 wherein the substrate is a transparency.

21. A process in accordance with claim 1 wherein the image is a xerographic image.

22. A process in accordance with claim 19 wherein the contacting is accomplished by agitation, soaking, pulping, or sonicating.

23. A process in accordance with claim 1 wherein the contacting is by soaking.

24. A process in accordance with claim 13 wherein the pigment is carbon black, magnetites, or mixtures thereof, cyan, magenta, yellow, red, blue, green, brown, or mixtures thereof.

25. A process for deinking from paper a toner image which consists essentially of contacting the image with an aqueous solution consisting essentially of water, ionic salts and a surfactant, and which solution is at a pH of from about 8 to about 10.

26. A process in accordance with claim 21 wherein contacting is accomplished at a temperature of from about 20° C. to about 80° C.

27. A process in accordance with claim 2 wherein the isolation of the fused image components from the aqueous mixture is accomplished by filtration, flotation, washing or decantation.

28. A process which consists essentially of providing a fused image on a substrate, and removing the image by contacting it with an aqueous solution comprised of water, surfactant, ionic salt and caustic component.

29. A process for removing a fused xerographic toner image from a substrate consisting essentially of contacting the image with an aqueous solution consisting essentially of water, a surfactant, ionic salt and a caustic reagent, and wherein said ionic salt consists essentially of a mixture of from about 5 to about 10 grams per liter of water of sodium chloride, from about 0.1 to about 0.5 gram per liter of water of ethylenediamine tetracetic acid disodium salt, from about 0.1 to about 1 gram per liter of water of potassium chloride, from about 0.05 to about 0.5 gram per liter of water of monosodium phosphate, from about 1 to about 5 grams per liter of water of disodium phosphate, and from about 0 to about 2 grams per liter of water of sodium fluoride.

30. A process in accordance with claim 29 wherein the ionic salt is a mixture of about 7.93 grams per liter of water of sodium chloride, about 0.38 gram per liter of water of ethylenediamine tetracetic acid disodium salt, about 0.4 gram per liter of water of potassium chloride, about 0.19 gram per liter of water of monosodium phosphate, about 1.95 grams per liter of water of disodium phosphate, and about less than 0.5 gram per liter of water of sodium fluoride.

31. A process for removing a fused xerographic toner image from a substrate consisting of contacting the image with an aqueous solution consisting of water, a surfactant, ionic salts and a caustic reagent, and wherein said ionic salts are comprised of a mixture of from about 5 to about 10 grams per liter of water of sodium chloride, from about 0.1 to about 0.5 gram per liter of water of ethylenediamine tetracetic acid disodium salt, from about 0.1 to about 1 gram per liter of water of potassium chloride, from about 0.05 to about 0.5 gram per liter of water of monosodium phosphate, from about 1 to about 5 grams per liter of water of disodium phosphate, and from about 0 to about 2 grams per liter of water of sodium fluoride.

* * * * *